(12) United States Patent
Lu et al.

(10) Patent No.: US 9,713,110 B2
(45) Date of Patent: Jul. 18, 2017

(54) METHOD AND NETWORK NODE FOR FACILITATING TIMING SYNCHRONIZATION IN NETWORK

(71) Applicant: Telefonaktiebolaget L M Ericsson (publ), Stockholm (SE)

(72) Inventors: Qianxi Lu, Beijing (CN); Qingyu Miao, Beijing (CN); Jonas Kronander, Knivsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 65 days.

(21) Appl. No.: 14/422,168

(22) PCT Filed: Sep. 25, 2014

(86) PCT No.: PCT/CN2014/087412
§ 371 (c)(1),
(2) Date: Feb. 17, 2015

(87) PCT Pub. No.: WO2016/045040
PCT Pub. Date: Mar. 31, 2016

(65) Prior Publication Data
US 2016/0262121 A1 Sep. 8, 2016

(51) Int. Cl.
*H04J 3/06* (2006.01)
*H04W 56/00* (2009.01)
(Continued)

(52) U.S. Cl.
CPC ........... *H04W 56/002* (2013.01); *H04L 43/16* (2013.01); *H04W 4/06* (2013.01)

(58) Field of Classification Search
CPC ......... H04L 43/16; H04L 25/10; H04L 7/033; H04W 56/002; H04W 4/06
See application file for complete search history.

(56) References Cited

U.S. PATENT DOCUMENTS

| 4,641,048 A | 2/1987 | Pollock |
| 5,959,980 A * | 9/1999 | Scott .................... H04B 7/2656 370/280 |

(Continued)

FOREIGN PATENT DOCUMENTS

| CN | 1391737 A | 1/2003 |
| EP | 2 568 632 A2 | 3/2013 |

OTHER PUBLICATIONS

International Search Report and the Written Opinion for International Application No. PCT/CN2014/087412, mailed Jul. 22, 2015, 11 pages.

(Continued)

*Primary Examiner* — Abdelnabi O Musa
(74) *Attorney, Agent, or Firm* — Nicholson De Vos Webster & Elliott LLP (57) ABSTRACT

The disclosure provides a method for facilitating timing synchronization in a network. The method comprises, at a network node: updating a timing value of the network node iteratively based on synchronization signals from neighboring network nodes; determining that the timing value is in a stable state; calculating a bias due to propagation delays of the synchronization signals based on a number of timing values obtained in iterations of said updating; and correcting the timing value based on the bias.

17 Claims, 3 Drawing Sheets

(51) Int. Cl.
*H04L 12/26* (2006.01)
*H04W 4/06* (2009.01)

(56) References Cited

U.S. PATENT DOCUMENTS

| | | | | |
|---|---|---|---|---|
| 2004/0077311 | A1* | 4/2004 | Riley | G01S 5/0268 |
| | | | | 455/12.1 |
| 2006/0181323 | A1* | 8/2006 | Cranford | H03K 5/133 |
| | | | | 327/263 |
| 2006/0280226 | A1* | 12/2006 | Krasner | H04B 7/2668 |
| | | | | 375/130 |
| 2007/0058591 | A1* | 3/2007 | Lamance | G01S 5/14 |
| | | | | 370/335 |
| 2011/0300878 | A1* | 12/2011 | Zhang | H04W 64/00 |
| | | | | 455/456.1 |

OTHER PUBLICATIONS

"3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 11)", 3GPP TR 36.922 V11.0.0, (Sep. 2012), pp. 1-74.

"3rd Generation Partnership Project; Technical Specification Group Radio Access Network; Study on LTE Device to Device Proximity Services; Radio Aspects (Release 12)", 3GPP TR 36.843 V12.0.1, (Mar. 2014), pp. 1-50.

Simeone et al., "Distributed Synchronization in Wireless Networks", IEEE Signal Processing Magazine, Global synchronization via local connections, Sep. 2008, pp. 81-97.

International Preliminary Report on Patentability for Application No. PCT/CN2012/087412, mailed Mar. 28, 2017, 4 pages.

\* cited by examiner

METHOD AND NETWORK NODE FOR FACILITATING TIMING SYNCHRONIZATION IN NETWORK

CROSS-REFERENCE TO RELATED APPLICATIONS

This application is a National stage of International Application No. PCT/CN2014/087412, filed Sep. 25, 2014, which is hereby incorporated by reference.

TECHNICAL FIELD

The disclosure relates to communication technology, and more particularly, to a method and a network node for facilitating timing synchronization in a network.

BACKGROUND

The ultimate goal of mobile broadband is ubiquitous and sustainable provision of unlimited data rates to anyone or anything at anytime. Ultra Dense Network (UDN) is a promising next step to the successful introduction of Long Term Evolution (LTE) for wide area and local area accesses. The UDN can be deployed in areas with high traffic consumptions and thus provide an evolution towards the above goal. Due to overprovision of access nodes and thus low average load in the access network, the UDN creates ubiquitous access opportunities for providing users with desired data rates even under realistic assumption on user density and traffic.

The overprovision is achieved by an extremely dense grid of access nodes. Inter-access-node distances in the order of tens of meters or below are envisioned. In in-door deployments, one or more access nodes are possible in each room. In addition to increased network capacity, densification (via reduced transmit powers) also enables access to vast spectrums in millimeter-wave bands and thus increased data rates.

As the very first step of communication, synchronization is critical to the UDN. Compared with access link synchronization between an Access Node (AN, e.g., an evolved NodeB (eNB)) and a User Equipment (UE), it is more challenging to achieve backhaul link synchronization between ANs, which is necessary for avoiding collisions between uplink and downlink (when Time Division Duplex (TDD) is applied) and achieving intelligent inter-cell interference coordination (e.g., enhanced Inter-Cell Interference Cooperation (eICIC)). In traditional cellular networks, the backhaul link synchronization is achieved via wired connections, including e.g., packet based synchronization (Network Time Protocol (NTP) or Precision Time Protocol (PTP) (IEEE1588)) or Global Navigation Satellite System (GNSS) based synchronization (Global Positioning System (GPS) or Galileo). However, these solutions are not applicable in the UDN where ANs are deployed in an in-door scenario with wireless backhaul links.

Figure 1:
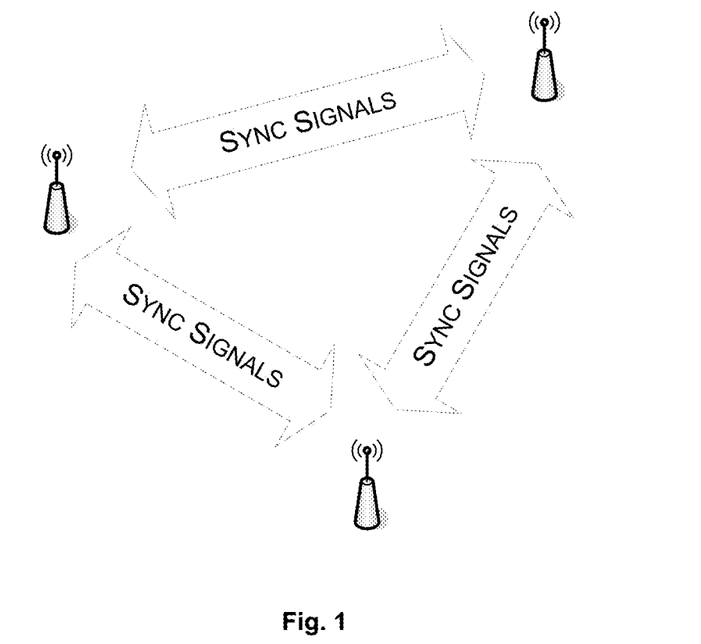
FIG. 1 is a schematic diagram showing a scenario of distributed synchronization.

Simeone, Spagnolini, Bar-Ness and Strogatz, Distributed Synchronization in Wireless Networks, IEEE Sig. Proc Magazine, 2008, discloses a solution for distributed synchronization in a wireless network. FIG. 1 shows a scenario where this solution is applied. As shown, each node broadcasts a synchronization signal to all of its neighboring nodes and each node updates its local timing value based on the synchronization signals received from all of its neighboring nodes. This solution requires a number of iterations before the timing values of the nodes converge.

However, the distributed synchronization solution is adversely affected by propagation delay of the synchronization signals, which leads to timing and phase errors.

Conventionally, the effect of the propagation delay can be mitigated by means of timing advance update. For a link between a pair of nodes, the propagation delay over the link can be mitigated by exchanging timing information between the nodes, estimating the propagation delay based on the timing information and removing the effect of estimated propagation delay from the timing values of the nodes. However, the increase in signaling overhead required for exchanging the timing information between each pair of nodes may be significant, especially when there are a large number of nodes e.g., in an UDN.

There is thus a need for an improved solution for distributed synchronization.

SUMMARY

It is an object of the present disclosure to provide a method and a network node for facilitating timing synchronization in a network, capable of removing, or at least mitigating, the effect of propagation delay from the timing update procedure without increase in signaling overhead.

In a first aspect, a method for facilitating timing synchronization in a network is provided. The method comprises, at a network node: updating a timing value of the network node iteratively based on synchronization signals from neighboring network nodes; determining that the timing value is in a stable state; calculating a bias due to propagation delays of the synchronization signals based on a number of timing values obtained in iterations of said updating; and correcting the timing value based on the bias.

In an embodiment, each of iterations of the updating comprises: estimating a timing value of each of the neighboring network nodes based on a synchronization signal received from that neighboring network node; and updating the timing value of the network node based on the estimated timing values of all the neighboring network nodes.

In an embodiment, it is determined that the timing value is in the stable state if the timing value has been updated for at least a predetermined number of times.

In an embodiment, it is determined that the timing value is in the stable state if a difference between two most recent deltas is smaller than a predetermined threshold. Here, each delta is defined as a difference between two consecutive timing values of the network node.

In an embodiment, the step of calculating comprises: calculating, as the bias, an arithmetic average of a predetermined number of most recent deltas. Here, each delta is defined as a difference between two consecutive timing values of the network node.

In an embodiment, the step of calculating comprises: calculating, as the bias, a moving average of deltas. Here, each delta is defined as a difference between two consecutive timing values of the network node.

In an embodiment, the step of correcting comprises: subtracting from the timing value a value obtained by applying a factor to the bias.

In an embodiment, the step of correcting comprises: subtracting from the timing value a constant value if the bias is larger than 0.

In a second aspect, a network node for facilitating timing synchronization in a network is provided. The network node comprises: an updating unit configured to update a timing value of the network node iteratively based on synchronization signals from neighboring network nodes; a determining unit configured to determine that the timing value is in a stable state; a calculating unit configured to calculate a bias due to propagation delays of the synchronization signals based on a number of timing values obtained in iterations of said updating; and a correcting unit configured to correct the timing value based on the bias.

In a third aspect, a network node for facilitating timing synchronization in a network is provided. The network node comprises means adapted to: update a timing value of the network node iteratively based on synchronization signals from neighboring network nodes; determine that the timing value is in a stable state; calculate a bias due to propagation delays of the synchronization signals based on a number of timing values obtained in iterations of said updating; and correct the timing value based on the bias.

In a fourth aspect, a network node for facilitating timing synchronization in a network is provided. The network node comprises a transceiver, a processor and a memory. The memory contains instructions executable by the processor whereby the network node is operative to: update a timing value of the network node iteratively based on synchronization signals from neighboring network nodes; determine that the timing value is in a stable state; calculate a bias due to propagation delays of the synchronization signals based on a number of timing values obtained in iterations of said updating; and correct the timing value based on the bias.

The above embodiments of the first aspect are also applicable for the second, third and fourth aspects.

With the embodiments of the present disclosure, a bias due to propagation delays of the synchronization signals is calculated based on local observation and the timing value is corrected based on the bias. In this way, the effect of propagation delay can be removed, or at least mitigated, from the timing update procedure. No additional signaling overhead is required.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Before describing the embodiments of the disclosure, the mathematical model of timing estimation will be introduced first. At a node i, the timing value of a node j is estimated and can be represented as:

$$\hat{\beta}_j = \beta_j + \beta_j' + PD_{ji} \qquad (1)$$

where $\hat{\beta}_j$ is the estimated timing value of the node j, $\beta_j$ is the actual timing value of the node j (i.e., the timing at which the node j actually transmitted a synchronization signal), $\beta_j'$ is an estimation error due to e.g., quality of the radio of i link between the node i and the node j, and $PD_{ji}$, denotes the propagation delay of the synchronization signal from the node j to the node i. The timing value $\hat{\beta}_j$ can be estimated by utilizing a non-coherent detection algorithm, e.g., Maximum Likelihood (ML) algorithm or Minimum Mean Square Error (MMSE) algorithm.

Then, the node i updates its local timing value according to the following iteration equation:

$$\beta_i(n+1) = \frac{\beta_i(n) + \sum_{j=1}^{M} \hat{\beta}_j(n)}{M+1} \qquad (2)$$

where n is the iteration index, $\beta_j$ is the timing value of the node i and M is the number of neighboring nodes.

Substituting (1) into (2) yields:

$$\beta_i(n+1) = \frac{\beta_i(n) + \sum_{j=1}^{M} (\beta_j(n) + \beta_j'(n))}{M+1} + \frac{\sum_{j=1}^{M} PD_{ji}}{M+1} \qquad (3)$$

It can be seen from the last term of Equation (3) that the effect of aggregate propagation delay will be included each time the timing value is updated iteratively. As a result, the timing value of each node will continuously increase.

Figure 2:
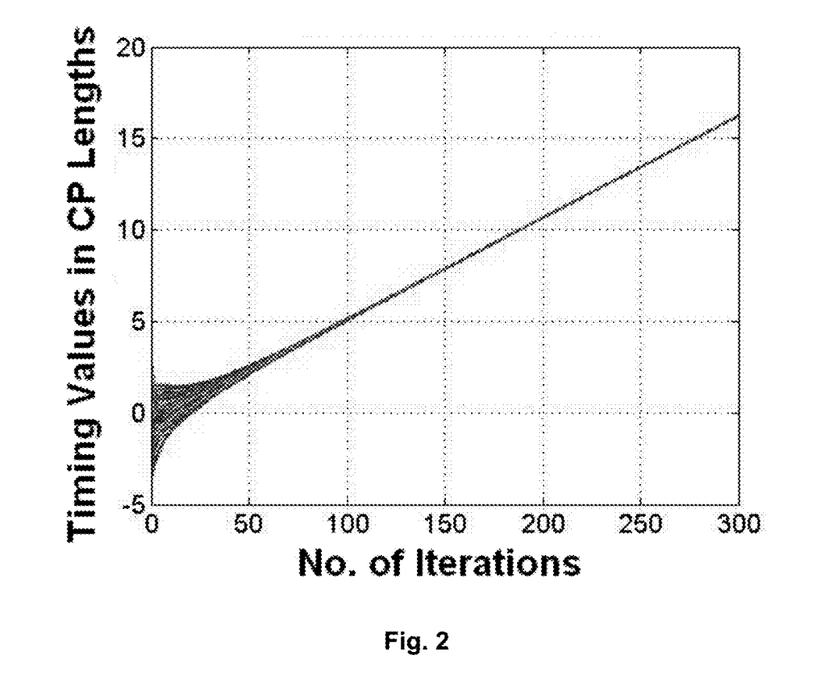
FIG. 2 is a schematic diagram showing a simulation result of iteratively updated timing values.

Reference is now made to FIG. 2, which shows a simulation result of iteratively updated timing values. In this simulation, it is assumed that there are 100 nodes in total and 62-point LTE synchronization signals are transmitted over Additive White Gaussian Noise (AWGN) channels with free-space path loss models. The horizontal axis of FIG. 2 represents the number of iterations and the vertical axis of FIG. 2 represents the timing values of the nodes in Cyclic Prefix (CP) lengths. It can be seen from FIG. 2 that the initial timing values of the nodes are distributed within a range from −3 CP lengths to 1 CP length and, after about 100 iterations, the timing values of the nodes converge, i.e., the difference between the timing values of any pair of nodes is smaller than a predetermined threshold. It can also be seen from FIG. 2 that, after the convergence, the timing value of each node keeps increasing. While the continuous increase in the timing values may not compromise the communication between the nodes, it becomes problematic when these nodes are ANs (eNBs). For example, in order for communication between an eNB and the UEs it serves, it is required that the timing value of the eNB shall not increase by more than one CP length within the resynchronization interval between the eNB and the UEs. Hence, the continuous increase in the timing value of the eNB will lead to a short resynchronization interval between the eNB and the UEs, which is inefficient and will result in increased signaling overhead between the eNB and the UEs as well as increased power consumptions at the UEs.

The inventors of the present invention realize that, the increase in the timing values is substantially linear, as shown in FIG. 2, and this is because, after the convergence, the term ($\beta_j(n)+\beta_j'(n)$) in Equation (3) will converge to a similar value for different nodes and thus the increase is mainly caused by the aggregate delay, which is a substantially constant component (in the sense that it does not vary as the iteration runs). It is further realized by the inventors that the effect of the propagation delay can be removed, or at least mitigated, by cancelling the substantially constant component from the timing values.

Figure 3:
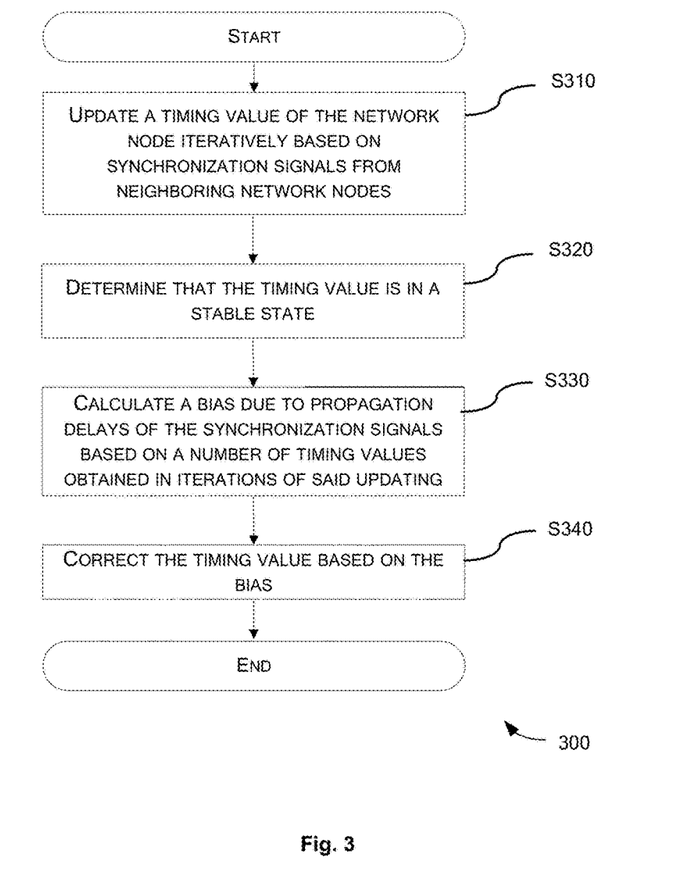
FIG. 3 is a flowchart illustrating a method for facilitating timing synchronization in a network according to an embodiment of the present disclosure.

FIG. 3 is a flowchart illustrating a method 300 for facilitating timing synchronization in a network according to an embodiment of the present disclosure. The method 300 can be applied in a UDN consisting of a number of network nodes (e.g., eNBs) and can be performed at a network node (e.g., eNB). It is to be noted here that the application of the method 300 is not limited to the UDN or any specific network or network topology. Rather, it can be applied to any network where synchronization among network nodes is performed in a distributed manner.

The method 300 includes the following steps.

At step S310, a timing value of the network node is updated iteratively based on synchronization signals from neighboring network nodes.

In the step S310, according to an example, in each of iterations of the updating, a timing value of each of the neighboring network nodes may be estimated based on a synchronization signal received from that neighboring network node. The estimated timing value can be represented by the above Equation (1). As mentioned above in connection with Equation (1), a non-coherent detection algorithm, e.g., ML or MMSE, can be used in the estimation. Then, the timing value of the network node can be updated based on the estimated timing values of all the neighboring network nodes. In particular, assuming that the network node is denoted as the node i and the neighboring network nodes are denoted as nodes j, j=1, . . . , M, the timing value $\beta_i$ of the network node i can be updated iteratively according to the above Equation (2). Here, it is assumed that the iteration index n is currently n=k i.e., the timing value $\beta_i$ of the network node i has been updated iteratively for k times in the step S310 and the current timing value of the network node is $\beta_i(k)$.

At step S320, it is determined that the timing value $\beta_i$ is in a stable state.

Here, the stable state means that the timing value $\beta_i$ of the network node i varies substantially uniformly over time. For example, as shown in FIG. 2, after about 100 iterations, the timing value of each network node varies (e.g. increases) uniformly over time. In this case, from the perspective of the entire network, the timing values of all the network nodes converge.

In the step S320, according to an example, it can be determined that the timing value $\beta_i$ is in the stable state if the timing value $\beta_i$ has been updated for at least a predetermined number of times.

For example, in the example shown in FIG. 2, it can be determined that the timing value $\beta_i$ is in the stable state if the timing value $\beta_i$ has been updated for at least 100 times, i.e., k≥100.

Alternatively, it can be determined that the timing value $\beta_i$ is in the stable state if a difference between two most recent deltas is smaller than a predetermined threshold. Here each delta is defined as a difference between two consecutive timing values of the network node.

In particular, a delta as used herein is defined as:

$$\Delta_i(n)=\beta_i(n)-\beta_i(n-1). \tag{4}$$

Accordingly, it can be determined that the timing value $\beta_i$ is in the stable state if:

$$|\Delta_i(k)-\Delta_i(k-1)|<TH_1 \tag{5}$$

where $\Delta_i(k)$ and $\Delta_i(k-1)$ denote the two most recent deltas (recall that the current iteration index is k) and $TH_1$ denotes the threshold.

At step S330, a bias due to propagation delays of the synchronization signals is calculated based on a number of timing values obtained in iterations of the updating.

In particular, in the step S330, according to an example, an arithmetic average of a predetermined number of most recent deltas can be calculated as the bias.

Again, each delta is defined as a difference between two consecutive timing values of the network node according to Equation (4).

In other words, the bias can be calculated according to:

$$B_i = \frac{\sum_{n=k-L+1}^{k} \Delta_i(n)}{L} \tag{6}$$

where $B_i$ denotes the bias, L≥1 is the predetermined number and thus $\sum_{n=k-L+1}^{k}\Delta_i(n)$ denotes the L most recent deltas (recall that the current iteration index is k). The bias $B_i$ is an estimate of the aggregate delay (i.e., the term $$\frac{\sum_{j=1}^{M} PD_{ji}}{M+1}$$

in Equation (3)).

Alternatively, a moving average of deltas can be calculated as the bias. Again, each delta is defined as a difference between two consecutive timing values of the network node according to Equation (4).

In other words, the bias can be calculated according to:

$$B_i(n)=\alpha*\Delta_i(n)+(1-\alpha)*B_i(n-1) \tag{7}$$

where $B_i(n)$ is the bias and $B_i(x)=0$ for x≤x1 where x1 is an iteration index at which the timing value $\beta_i$ is determined to be stable for the first time, and 0<α<1 is a moving filtering coefficient which can be e.g., 0.1 or 0.2.

At step S340, the timing value $\beta_i(k)$ is corrected based on the bias.

In particular, according to an example, the timing value $\beta_i(k)$ can be corrected by subtracting from the timing value $\beta_i(k)$ a value obtained by applying a factor to the bias. For example, when the bias is calculated according to Equation (6), the timing value $\beta_i(k)$ can be corrected according to:

$$\bar{\beta}_i(k)=\beta_i(k)-\max(\gamma*B_i,0) \tag{8}$$

where $\bar{\beta}(k)$ is the corrected timing value, 0<γ≤1 is a factor applied to the bias $B_i$ and can be e.g., 0.1 or 0.2, and the purpose for comparison between $\gamma*B_i$ and 0 is to filter out a negative bias which is not reasonable. When the bias is calculated according to Equation (7), the term $B_i$ in Equation (8) should be replaced with $B_i(n)$.

Alternatively, the timing value $\beta_i(k)$ can be corrected by subtracting from the timing value $\beta_i(k)$ a constant value if the bias is larger than 0. That is, the timing value $\beta_i(k)$ can be corrected according to:

$$\bar{\beta}_i(k) = \begin{cases} \beta_i(k) - \delta, & B_i > 0 \\ \beta_i(k), & B_i \leq 0 \end{cases} \tag{9}$$

where $\bar{\beta}_i(k)$ is the corrected timing value, $\delta>0$ is the constant value and can be e.g., 10 or 50 µs, and the purpose for comparison between $B_i$ and 0 is to filter out a negative bias which is not reasonable. When the bias is calculated according to Equation (7), the term $\beta_i$ in Equation (9) should be replaced with $B_i(n)$.

Then, in the next iteration (n=k+1), the network node i transmits a synchronization signal at the corrected timing value $\bar{\beta}_i(k)$.

In this way, the effect of the aggregate propagation delay can removed, or at least mitigated, from the timing update procedure without increase in signaling overhead. Unlike the conventional timing advance update, there is no need in the method 300 to estimate the propagation delay over every individual link between each pair of nodes, which would be computationally demanding.

Correspondingly to the method 300 as described above, a network node for facilitating timing synchronization in a network is provided. The network node includes means adapted to: update a timing value of the network node iteratively based on synchronization signals from neighboring network nodes; determine that the timing value is in a stable state; calculate a bias due to propagation delays of the synchronization signals based on a number of timing values obtained in iterations of said updating; and correct the timing value based on the bias.

Figure 4:
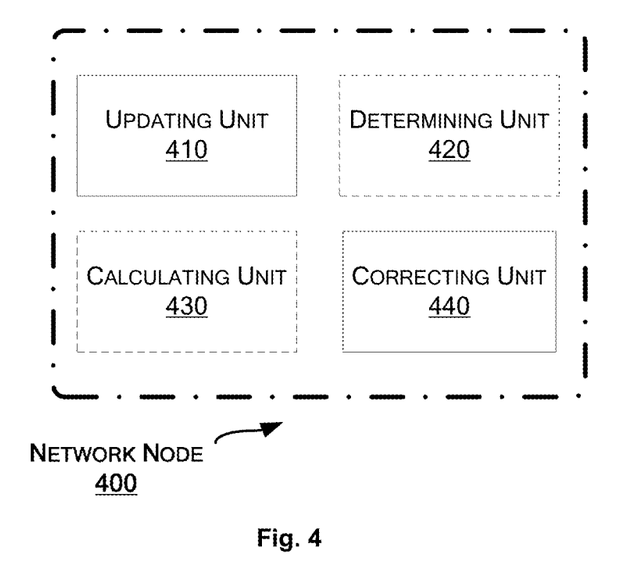
FIG. 4 is a block diagram of a network node for facilitating timing synchronization in a network according to an embodiment of the present disclosure.

FIG. 4 is a block diagram of a network node 400 for facilitating timing synchronization in a network according to an embodiment of the present disclosure.

As shown in FIG. 4, the network node 400 includes an updating unit 410 configured to update a timing value of the network node iteratively based on synchronization signals from neighboring network nodes. The network node 400 further includes a determining unit 420 configured to determine that the timing value is in a stable state. The network node 400 further includes a calculating unit 430 configured to calculate a bias due to propagation delays of the synchronization signals based on a number of timing values obtained in iterations of said updating. The network node 400 further includes: a correcting unit 440 configured to correct the timing value based on the bias.

In an embodiment, the updating unit 410 is configured to, in each of iterations: estimate a timing value of each of the neighboring network nodes based on a synchronization signal received from that neighboring network node; and update the timing value of the network node based on the estimated timing values of all the neighboring network nodes.

In an embodiment, the determining unit 420 is configured to determine that the timing value is in the stable state if the timing value of the network node has been updated for at least a predetermined number of times.

In an embodiment, the determining unit 420 is configured to determine that the timing value is in the stable state if a difference between two most recent deltas is smaller than a predetermined threshold, wherein each delta is defined as a difference between two consecutive timing values of the network node.

In an embodiment, the calculating unit 430 is configured to calculate, as the bias, an arithmetic average of a predetermined number of most recent deltas, wherein each delta is defined as a difference between two consecutive timing values of the network node.

In an embodiment, the calculating unit 430 is configured to calculate, as the bias, a moving average of deltas, wherein each delta is defined as a difference between two consecutive timing values of the network node.

In an embodiment, the correcting unit 440 is configured to subtract from the timing value a value obtained by applying a factor to the bias.

In an embodiment, the correcting unit 440 is configured to subtracting from the timing value a constant value if the bias is larger than 0.

Each of the units 410-440 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 3.

Figure 5:
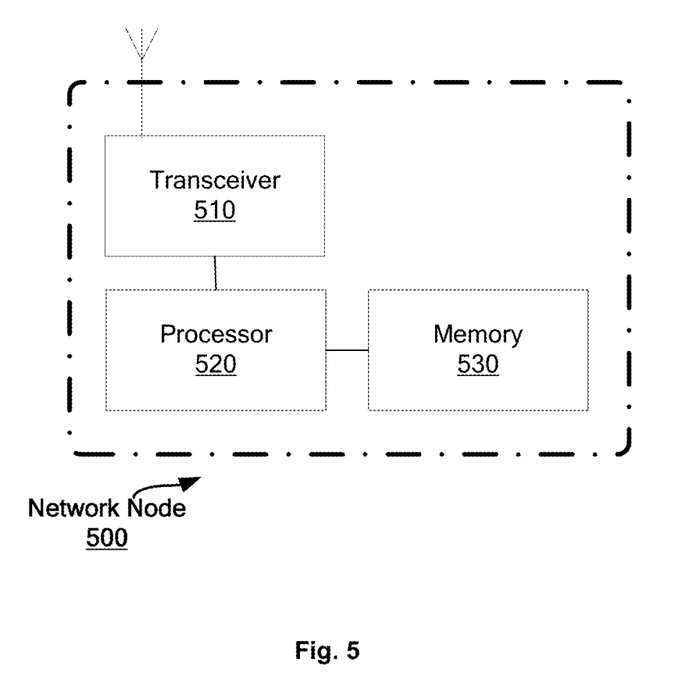
FIG. 5 is a block diagram of a network node for facilitating timing synchronization in a network according to another embodiment of the present disclosure.

FIG. 5 is a block diagram of a network node 500 for facilitating timing synchronization in a network according to another embodiment of the present disclosure.

The network node 500 includes a transceiver 510, a processor 520 and a memory 530. The memory 530 contains instructions executable by the processor 520 whereby the network node 500 is operative to: update a timing value of the network node iteratively based on synchronization signals from neighboring network nodes; determine that the timing value is in a stable state; calculate a bias due to propagation delays of the synchronization signals based on a number of timing values obtained in iterations of said updating; and correct the timing value based on the bias.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 520 causes the network node 500 to perform the actions, e.g., of the procedure described earlier in conjunction with FIG. 3.

The computer program product may be configured as a computer program code structured in computer program modules. The computer program modules could essentially perform the actions of the flow illustrated in FIG. 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored.

For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for facilitating timing synchronization in a network, comprising, at a network node:

updating a local timing value of the network node iteratively based on synchronization signals from neighboring network nodes to obtain synchronization with respective remote timing values of the neighboring network nodes;

determining that the local timing value is in a stable state, wherein it is determined that the local timing value is in the stable state when a difference between two most recent deltas is smaller than a predetermined threshold, and wherein each of the two most recent deltas is defined as a difference between two consecutive local timing values of the network node;

calculating a bias due to propagation delays of the synchronization signals based on a plurality of local timing values from the local timing values obtained in a plurality of iterations of said updating; and correcting the local timing value based on the bias.

2. The method of claim 1, wherein each one of the iterations of said updating comprises:
estimating a remote timing value of each of the neighboring network nodes based on a synchronization signal received from that neighboring network node; and
updating the local timing value of the network node based on the estimated remote timing values of all the neighboring network nodes.

3. The method of claim 1, wherein it is determined that the local timing value is in the stable state when the local timing value has been updated for at least a predetermined number of times.

4. The method of claim 1, wherein said calculating comprises:
calculating, as the bias, an arithmetic average of a predetermined number of most recent deltas, wherein each of the two most recent deltas is defined as a difference between two consecutive local timing values of the network node.

5. The method of claim 1, wherein said calculating comprises:
calculating, as the bias, a moving average of deltas, wherein each delta is defined as a difference between two consecutive local timing values of the network node.

6. The method of claim 1, wherein said correcting comprises:
subtracting from the local timing value a value obtained by applying a factor to the bias.

7. The method of claim 1, wherein said correcting comprises:
subtracting from the local timing value a constant value when the bias is larger than 0.

8. A network node for facilitating timing synchronization in a network, comprising:
a processor; and
a memory that contains instructions, which when executed by the processor cause the network node to:
update a local timing value of the network node iteratively based on synchronization signals from neighboring network nodes to obtain synchronization with respective remote timing values of the neighboring network nodes;
determine that the local timing value is in a stable state, wherein the local timing value is in the stable state when a difference between two most recent deltas is smaller than a predetermined threshold, and wherein each of the two most recent deltas is defined as a difference between two consecutive local timing values of the network node;
calculate a bias due to propagation delays of the synchronization signals based on a plurality of local timing values from the local timing values obtained in iterations of said updating; and
correct the local timing value based on the bias.

9. The network node of claim 8, wherein the network node is further to, in each one of the iterations:
estimate a remote timing value of each of the neighboring network nodes based on a synchronization signal received from that neighboring network node; and
update the local timing value of the network node based on the estimated remote timing values of all the neighboring network nodes.

10. The network node of claim 8, wherein the network node is further to:
determine that the local timing value is in the stable state when the local timing value of the network node has been updated for at least a predetermined number of times.

11. The network node of claim 8, wherein the network node is further to:
calculate, as the bias, an arithmetic average of a predetermined number of most recent deltas, wherein each of the two most recent deltas is defined as a difference between two consecutive local timing values of the network node.

12. The network node of claim 8, wherein the network node is further to:
calculate, as the bias, a moving average of deltas, wherein each delta is defined as a difference between two consecutive local timing values of the network node.

13. The network node of claim 8, wherein the network node is further to:
subtract from the local timing value a value obtained by applying a factor to the bias.

14. The network node of claim 8, wherein the network node is further to:
subtract from the local timing value a constant value when the bias is larger than 0.

15. A non-transitory machine-readable storage medium that provides instructions, which when executed by a processor of a network node, cause said processor to perform operations comprising:
updating a local timing value of the network node iteratively based on synchronization signals from neighboring network nodes to obtain synchronization with respective remote timing values of the neighboring network nodes;
determining that the local timing value is in a stable state, wherein it is determined that the local timing value is in the stable state when a difference between two most recent deltas is smaller than a predetermined threshold, wherein each of the two most recent deltas is defined as a difference between two consecutive local timing values of the network node;
calculating a bias due to propagation delays of the synchronization signals based on a plurality of local timing values from the local timing values obtained in a plurality of iterations of said updating; and
correcting the local timing value based on the bias.

16. The storage medium of claim 15, wherein each one of the iterations of said updating comprises:
estimating a remote timing value of each of the neighboring network nodes based on a synchronization signal received from that neighboring network node; and updating the local timing value of the network node based on the estimated remote timing values of all the neighboring network nodes.

17. The storage medium of claim 15, wherein it is determined that the local timing value is in the stable state when the local timing value has been updated for at least a predetermined number of times.

* * * * *